(12) United States Patent
Liu

(10) Patent No.: US 6,650,385 B1
(45) Date of Patent: Nov. 18, 2003

(54) SCATTERING FRINGE FIELD OPTICAL-COMPENSATED REFLECTIVE AND TRANSFLECTIVE LIQUID CRYSTAL DISPLAY

(75) Inventor: Hong-Da Liu, Hsinchu (TW)

(73) Assignee: Prime View International Co., Ltd., Hsinchu (TW)

(*) Notice: Subject to any disclaimer, the term of this patent is extended or adjusted under 35 U.S.C. 154(b) by 22 days.

(21) Appl. No.: 10/128,469

(22) Filed: Apr. 24, 2002

(51) Int. Cl.[7] .................. G02F 1/1335; G02F 1/1343
(52) U.S. Cl. .................. 349/113; 349/96; 349/112; 349/141; 349/117; 349/119
(58) Field of Search .................. 349/112, 113, 349/141, 96, 99, 117, 118, 119

(56) References Cited
U.S. PATENT DOCUMENTS 6,215,542 B1 * 4/2001 Lee et al. .................. 349/143
6,323,927 B1 * 11/2001 Hiroshi .................. 349/141
2002/0008799 A1 * 1/2002 Ota et al. .................. 349/43

* cited by examiner

Primary Examiner—Tarifur R. Chowdhury
(74) Attorney, Agent, or Firm—Rosenberg, Klein & Lee

(57) ABSTRACT

In a reflective or transflective LCD comprising a TFT plate and a color filter plate with a LC layer of negative dielectric anisotropy inserted therebetween, a pixel electrode and a common electrode consisting of a plurality of strips are provides on the TFT plate to produce a fringe field applied on the LC layer for a phase difference that is compensated by a compensator. A scattering film is introduced in the LCD to enhance the brightness. A polarizer is arranged with its polarization direction at an angle from the extension axis of the compensator.

17 Claims, 24 Drawing Sheets

Isoluminance contour

SCATTERING FRINGE FIELD OPTICAL-COMPENSATED REFLECTIVE AND TRANSFLECTIVE LIQUID CRYSTAL DISPLAY

FIELD OF THE INVENTION

The present invention relates generally to a reflective and transflective liquid crystal display (LCD), and more particularly, to a scattering fringe field optical-compensated (SFFC) reflective and transflective LCD.

BACKGROUND OF THE INVENTION

Conventional twisted nematic (TN) mode LCD intrinsically has low contrast ratio (CR), narrow viewing angle and large color dispersion. To obtain wider viewing angles for such LCD's, fringe field is proposed to be applied on the LC molecules thereof, for example, in the LCD with improved viewing angle and transmittance disclosed by U.S. Pat. No. 6,215,542 issued to Lee et al. However, to manufacture the LCD disclosed by Lee et al., a 6-mask process is required, which comprises one more mask process than that for a conventional transmittive TN mode LCD, and the etch process for the indium tin oxide (ITO) electrode thereof is also complicated. On the other hand, a conventional reflective LCD is a TN mode LCD in combination with a reflector, so that the viewing angle thereof is limited by the TN mode under 40 degrees (CR>10:1) and the dichromation thereof is serious ($\Delta E(x, y) \geq 0.13$). Further, the manufacture process for conventional reflective TN mode LCD is complicated due to the formation of the additional reflector thereof. In addition, a new type of LCD, transflective LCD, gains attention more and more. The above-mentioned problems for the reflective LCD's are also present for the transflective LCD's. So far the fringe field technique is not available for the reflective and transflective LCD's. Another problem introduced by the fringe field scheme is that light leakage results in poor dark state for a normal black mode.

It is therefore desired a reflective and transflective LCD with wide viewing angle, high contrast ratio and low color dispersion.

SUMMARY OF THE INVENTION

One object of the present invention is an electrode structure to produce a fringe field in combination with a compensator and a polarizer to improve the viewing angle, contrast ratio and color dispersion for a reflective or transflective LCD.

Another object of the present invention is an electrode structure to produce a fringe field in combination with a compensator and a polarizer to simplify the structure and enhance the brightness of a reflective or transflective LCD.

A scattering fringe field optical-compensated reflective LCD comprises, according to the present invention, a thin film transistor (TFT) plate and a color filter plate spaced apart from each other with a LC layer inserted therebetween. A reflective electrode structure formed on the TFT plate is provided to produce a fringe field applied on the LC layer which has a type of negative dielectric anisotropy and an alignment direction. The reflective electrode structure includes a pixel electrode and a common electrode consisting of a plurality of strips to drive the LC layer for a phase difference by the fringe field, and the retardation thus generated by the LC layer is compensated by a compensator formed on the color filter plate. A polarizer is arranged outside of the pixel cell with its polarization axis at an angle from the extension axis of the compensator. In addition, a scattering film is introduced on the color filter plate side to enhance the brightness.

In a scattering fringe field optical-compensated transflective LCD, according to the present invention, a LC layer of negative dielectric anisotropy is inserted between a TFT plate and a color filter plate. A transflective electrode structure is formed on the TFT plate to produce a fringe field to be applied on the LC layer which has a rubbing direction. The transflective electrode structure includes a pixel electrode and a common electrode consisting of a plurality of strips to drive the LC layer for a phase difference by the fringe field. Two compensators and two polarizers are arranged respectively on the TFT plate and color filter plate. The polarization axis of the polarizer and the extension axis of the compensator are arranged with an angle therebetween. Also, a scattering film is introduced on the color filter plate side to enhance the brightness.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
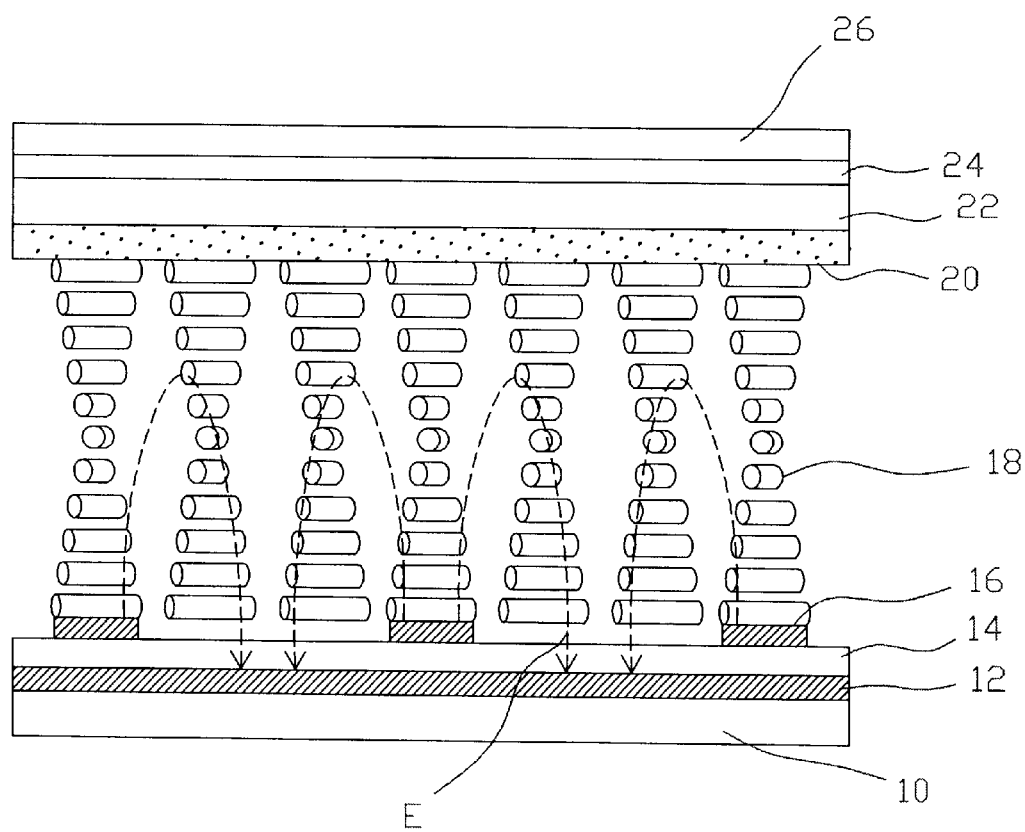
FIG. 1 shows the cross-sectional view of one pixel structure in a simplified reflective LCD according to the present invention.

A simplified structure of a LC pixel is shown in FIG. 1 for explanation of an SFFC reflective LCD according to the present invention. On a TFT plate 10 there is formed a reflective electrode structure, which includes a pixel electrode 12 and a common electrode 16 with an insulator 14 inserted therebetween. However, the common electrode 16 consists of a plurality of strips, and the width d of each strip and the space w between them are in the range of 1–10 $\mu$m and preferably of 3–5 $\mu$m. When a voltage difference is applied between the common electrode 16 and pixel electrode 12, a bent electric field E is produced between the common electrode 16 and pixel electrode 12 through a LC layer 18 and the insulator 14 and in turn applied on the LC layer 18 which is of a type of negative dielectric anisotropy ($\Delta\varepsilon<0$). On the other side of the LC layer 18 opposite to the TFT plate 10, an optical stack is arranged, which includes a scattering film 20, a color filter plate 22, a compensator 24, and a polarizer 26. In this scheme, single polarizer 26 outside the liquid crystal cell is employed for the pixel such that the reflectivity is larger. The bent electric field E applied on the LC layer 18 results in a phase difference produced by the LC layer 18, and the retardation resulted from the LC layer 18 thus produced is compensated by the compensator 24 which has an extension axis with an angle from the polarization axis of the polarizer 26. This manner an excellent dark state for the normal black mode is obtained. The scattering film 20 can be also arranged on the TFT plate side or outside of the pixel cell, for example, attached to the polarizer 26.

Figure 2:
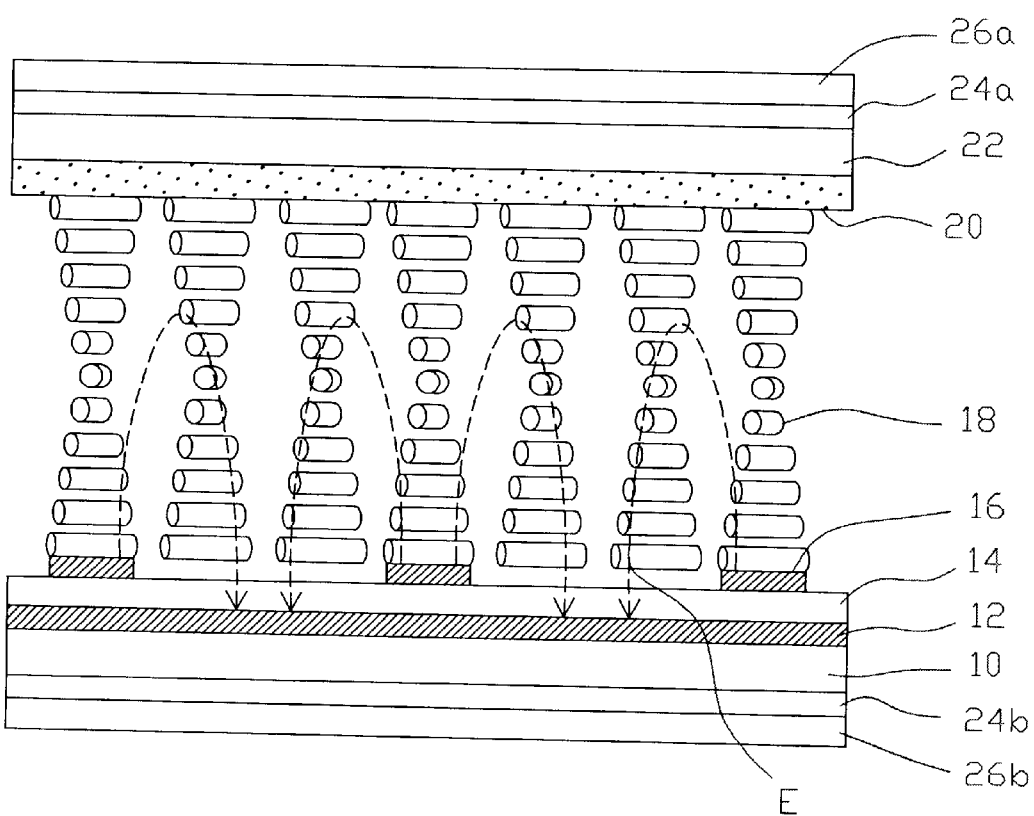
FIG. 2 shows the cross-sectional view of one pixel structure in a simplified transflective LCD according to the present invention.

FIG. 2 shows a simplified structure of a liquid crystal pixel in a transflective LCD, of which another compensator 24b and polarizer 26b are arranged on the other side of the TFT plate 10 opposite to the LC layer 18 in addition to the structure shown in FIG. 1. However, the pixel electrode 12 and common electrode 16 with the insulator 14 inserted therebetween in this transflective LCD form a transflective electrode, and the rear side compensator 24b and polarizer 26b have an optical dependence to the front side compensator 24a and polarizer 26a. In particular, the front side compensator 24 and LC 18 in FIG. 1 and compensator 24a and LC 18 in FIG. 2 are selected in combination to be a quarter wave (i.e., $\lambda/4$) plate or to be substantially circularly polarized. The rear side compensator 24b in FIG. 2 is also selected to be a $\lambda/4$ plate or substantially circularly polarized. Moreover, the rear side polarizer 26b in FIG. 2 is arranged with its polarization orthogonal to that of the front side polarizer 26a. This manner good dark state is realized for the reflective LCD of FIG. 1 and for the transflective LCD of FIG. 2 by such optical arrangement.

Figure 3:
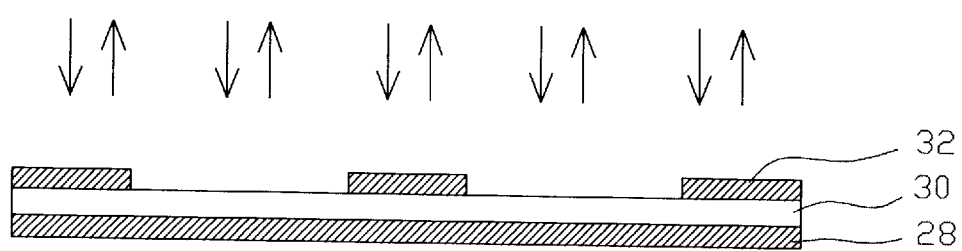
FIG. 3 shows a reflective electrode structure for the reflective LCD of FIG. 1.

A reflective electrode structure for a reflective LCD is shown in FIG. 3, which includes a pixel electrode 28 and a common electrode 32 with an insulator 30 inserted therebetween. These two electrode layers 28 and 32 are totally reflective and formed of high reflectivity metal, such as Al, Cr, Ag and their alloy. The insulator 30 between the pixel and common electrodes 28 and 32 is formed of $SiO_x$, $SiN_x$ or organic insulator.

Figure 4:
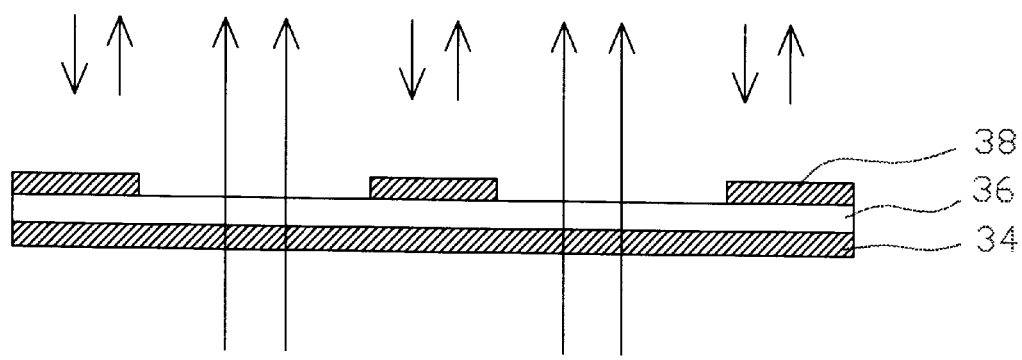
FIG. 4 shows a partially reflective and partially transparent electrode structure for the transflective LCD of FIG. 2.
Figure 5:
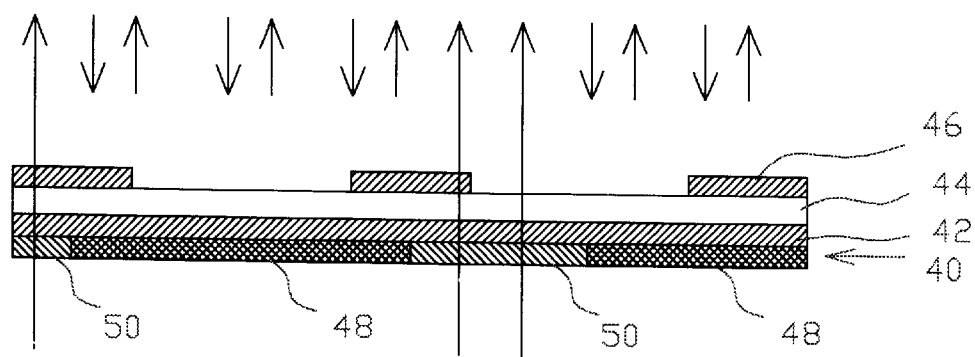
FIG. 5 shows another partially reflective and partially transparent electrode structure for the transflective LCD of FIG. 2.
Figure 6:
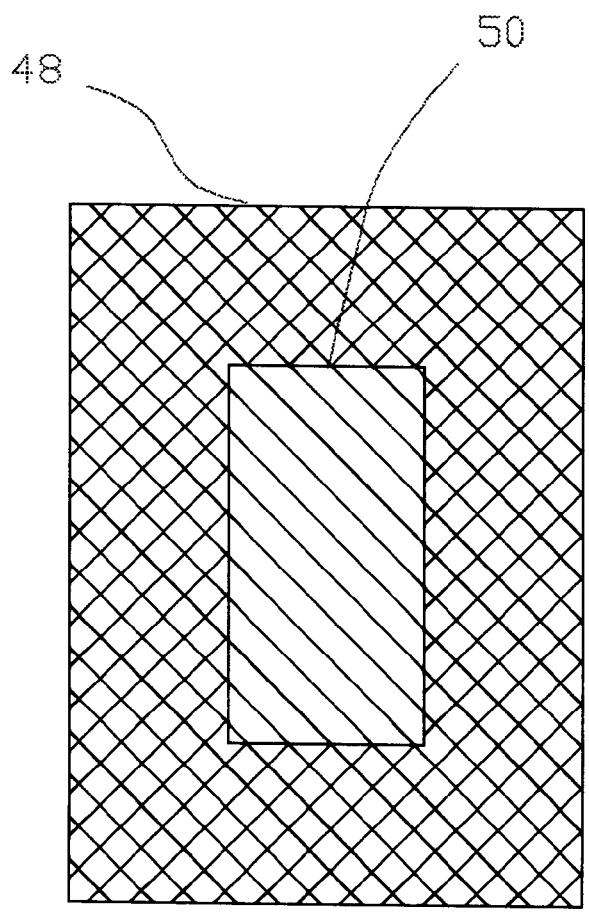
FIG. 6 shows a layout of the bottom layer of the electrode structure shown in FIG. 5.
Figure 7:
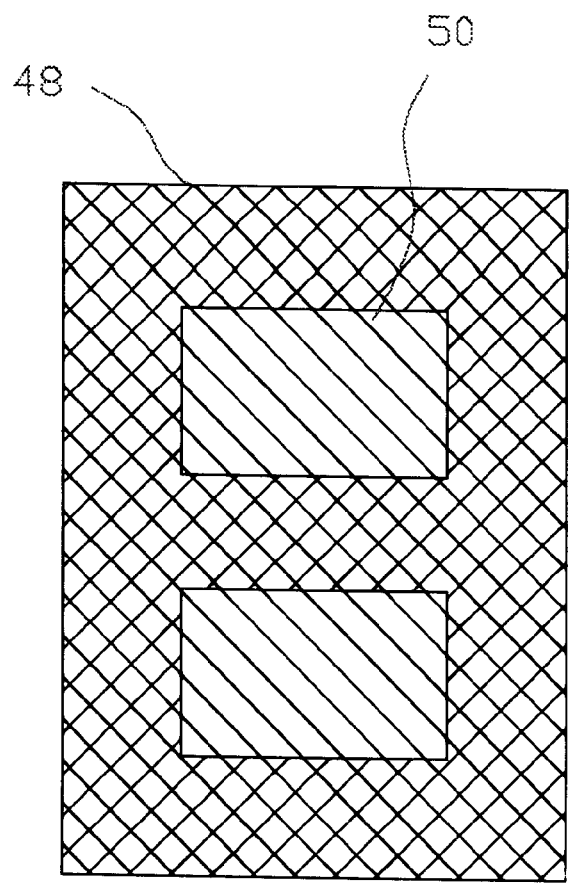
FIG. 7 shows another layout of the bottom layer of the electrode structure shown in FIG. 5.
Figure 8:
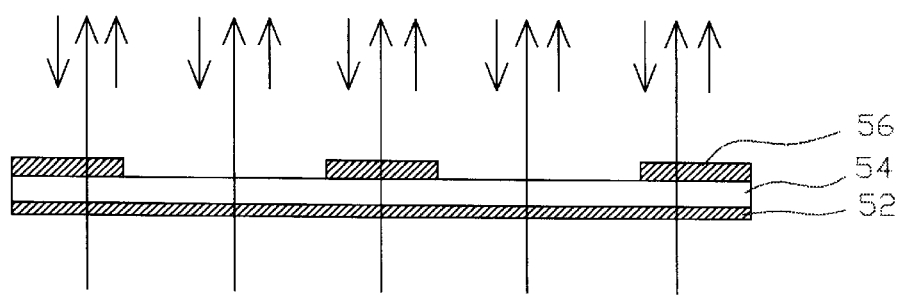
FIG. 8 shows yet another partially reflective and partially transparent electrode structure for the transflective LCD of FIG. 2.

For a transflective LCD a transflective electrode structure is shown in FIG. 4, which includes a totally reflective metal electrode 38 and a transparent electrode 34 such as an ITO layer so as to obtain a partially reflective and partially transparent electrode structure. Likewise, an insulator 36 is inserted between the top layer 38 and the bottom layer 34. Another transflective electrode structure for a transflective LCD is shown in FIG. 5. The top layer 46 and intermediate layer 42 spaced with an insulator 44 from the top layer 46 are transparent, or partially reflective and partially transparent. The bottom layer 40, however, includes a plurality of totally reflective regions 48 and a plurality of transparent regions 50. The combination of these three layers 40, 42 and 46 results in a partially reflective and partially transparent electrode structure. FIGS. 6 and 7 are two patterns of the reflective and transparent regions 48 and 50 in the planar view from the bottom of the electrode structure shown in FIG. 5. FIG. 8 is still another transflective electrode structure for a transflective LCD, of which the common electrode 56 and pixel electrode 52 spaced with an insulator 54 from the common electrode 56 both are very thin metal such that they are partially reflective and partially transparent.

Figure 9:
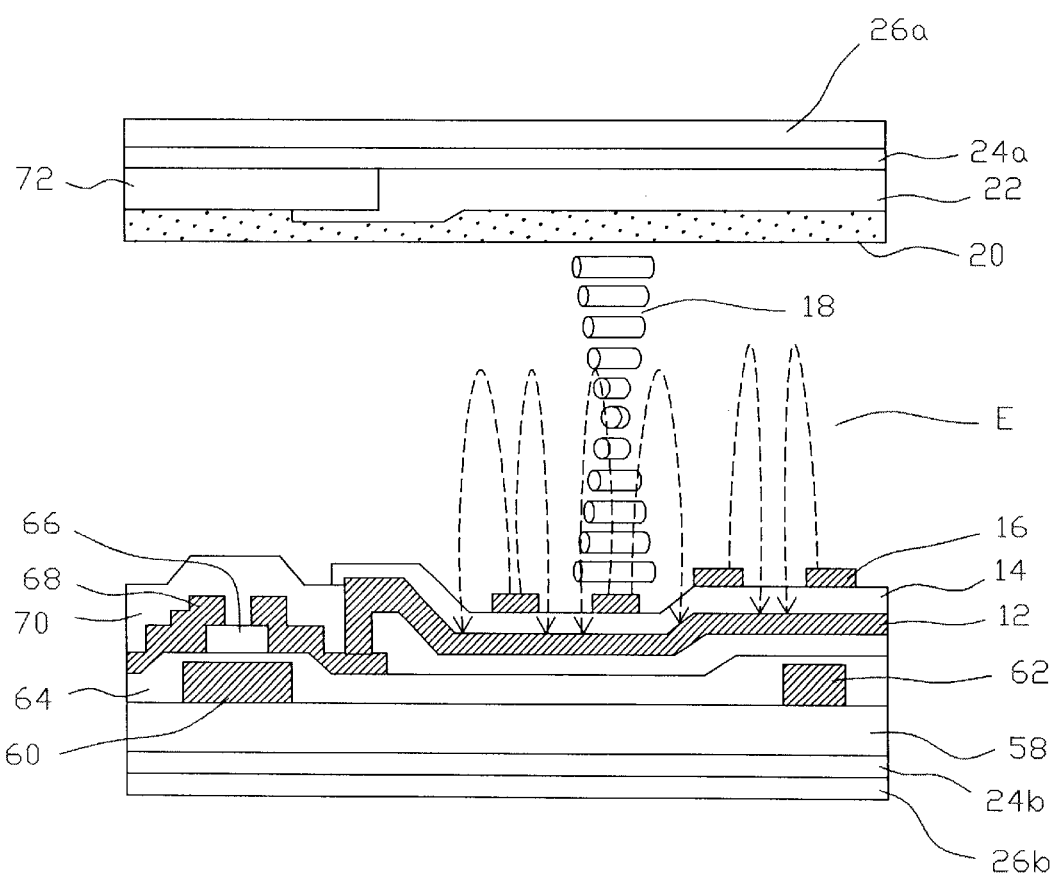
FIG. 9 shows the cross-sectional view of one pixel structure including the detailed structure of the TFT plate in the transflective LCD of FIG. 2.

A more detailed structure of a LC pixel in a transflective LCD is shown in FIG. 9. In addition to the optical arrangement as in FIG. 2, the TFT plate includes a substrate 58 formed with a TFT thereon. The gate 60 of the TFT and the counter electrode 62 are formed of metal 1 and covered with insulator 64, the source/drain 68 of the TFT are formed of metal 2 on the insulator 64 and a-Si island 66 and covered with a passivation 70, the pixel electrode 12 connected to the metal 2 is formed of metal 3, and the common electrode 16 is formed of metal 4. Further, a black matrix 72 is formed on the front side to mask the TFT structure. The strips electrode, such as the various structures shown in FIGS. 3–8, requires one less mask process than that for conventional reflective TN mode LCD's, the design thus becomes simplified, and the metal etch process thereof is also more easy to practice than the ITO etch process. In addition, the top substrate for the color filter 22 needs not to be formed with ITO. Since the common electrode 16 is directly formed on the TFT plate, the current processes for metal 1 and metal 2 of a LCD panel can be applied and the overlapped area of the common electrode 16 on the pixel electrode 12 can be available for storage capacitor (Cs). Therefore, the storage capacitor can be designed larger, thereby the LC with higher electric polarity group, such as cyano (—CN), can be selected to improve the response time and driving voltage of the LCD.

Figure 10:
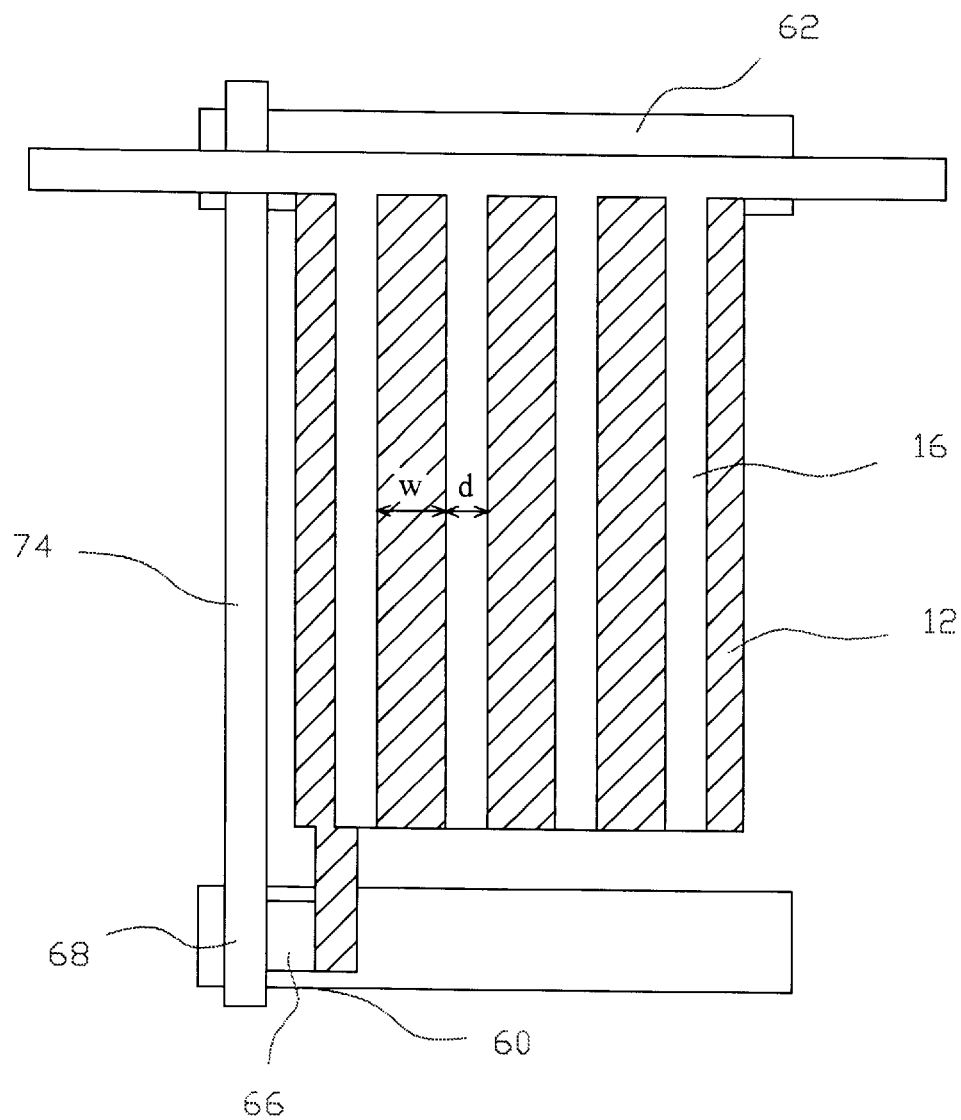
FIG. 10 shows the top view of the complete electrodes of the transflective LCD shown in FIG. 9.
Figure 11:
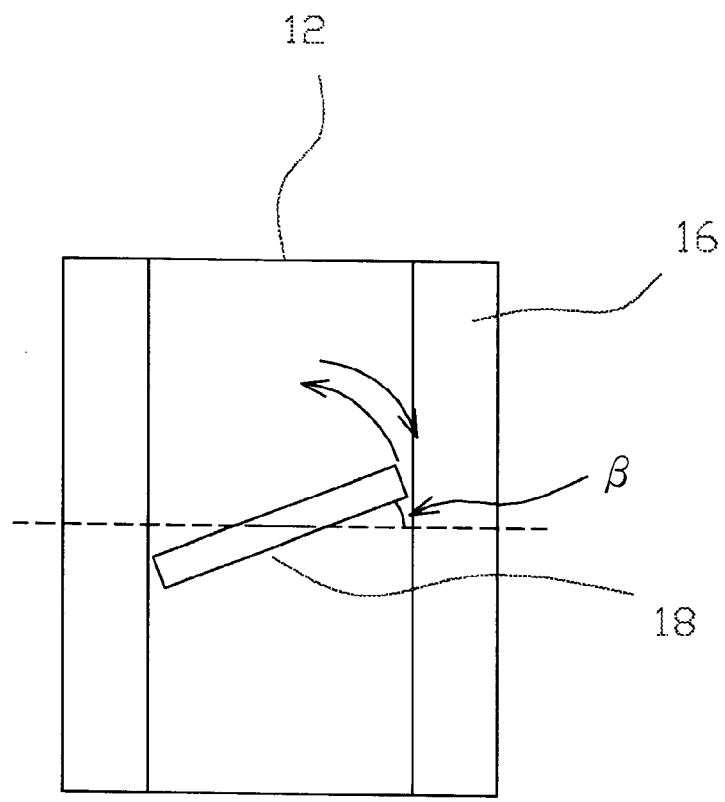
FIG. 11 shows the top view of the OFF state in a LC cell.
Figure 12:
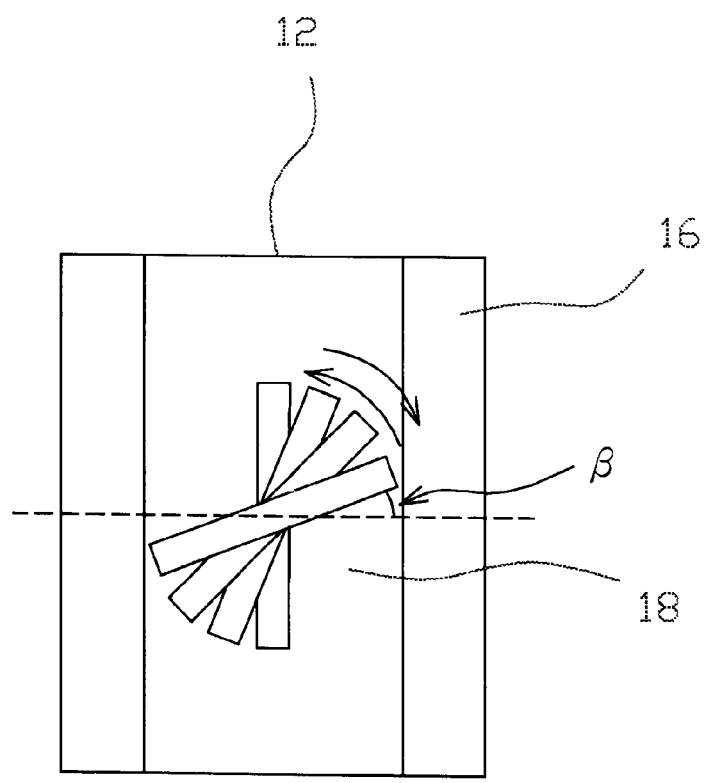
FIG. 12 shows the top view of the ON state in a LC cell.
Figure 13:
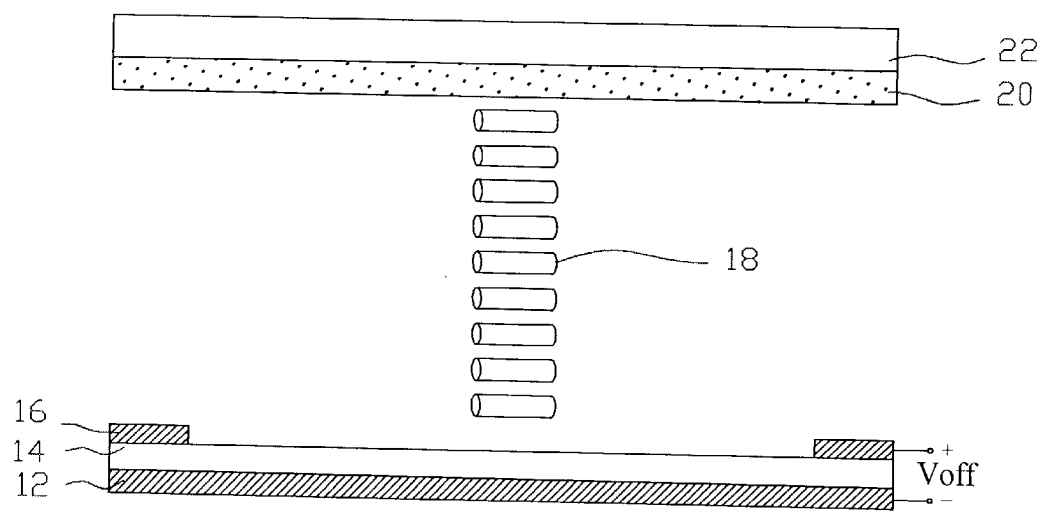
FIG. 13 shows the cross-sectional view of the OFF state in by a LC cell.
Figure 14:
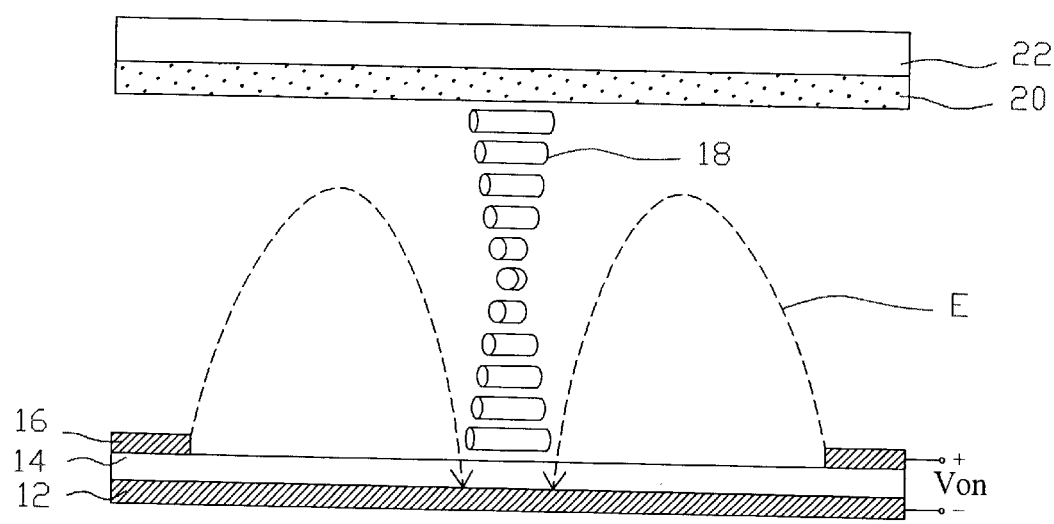
FIG. 14 shows the cross-sectional view of the ON state in a LC cell.

A top view of the electrode structure in FIG. 9 is shown in FIG. 10. Between the scan line 60 and counter electrode 62 (metal 1), the common electrode 16 (metal 4) above the pixel electrode 12 (metal 3) includes a plurality of stripes with width d and spaced with w from each other, and the bus line 74 connected to the TFT is also formed of metal 2. The width d and space w both are in the range of 1–10 μm and preferably of 3–5 μm. The interactive between the electric field E produced by the electrodes 12 and 16 and the LC molecules 18 is shown in FIGS. 11 and 12. For the OFF state there is no voltage difference applied between the electrodes 12 and 16, thus the LC molecules 18 are all aligned in the rubbing direction with an angle β from the axis normal to the common electrode 16 as shown in FIG. 11. The angled is in the range of 0–90 degrees and preferably of 5–25 degrees. However, when a voltage difference is applied between the electrodes 12 and 16, i.e., in the ON state, an electric field is produced to apply on the LC molecules 18 to twist them to an angle between the rubbing direction β and 90 degrees from the top layer to the bottom layer as shown in FIG. 12. Two more illustrations for the OFF and ON states, with their cross-sectional view are shown in FIGS. 13 and 14 respectively. In FIG. 13, the voltage difference between the electrodes 12 and 16 is the OFF state voltage Voff, and the LC molecules 18 are all aligned in the rubbing direction since there is no electric field applied on them. Contrarily, in FIG. 14, an infringe field E is produced for a ON state voltage Von applied between the electrodes 12 and 16, and the LC molecules 18 is thus twisted in the manner that the top and bottom layers are still in the rubbing direction, while the others in various angles from the original direction. The more the LC molecules 18 are far from the top or bottom, the larger the angle it is twisted. The LC molecules 18 in the middle of the pixel cell will be parallel to the common electrode 16, as shown in FIG. 12.

Figure 15:
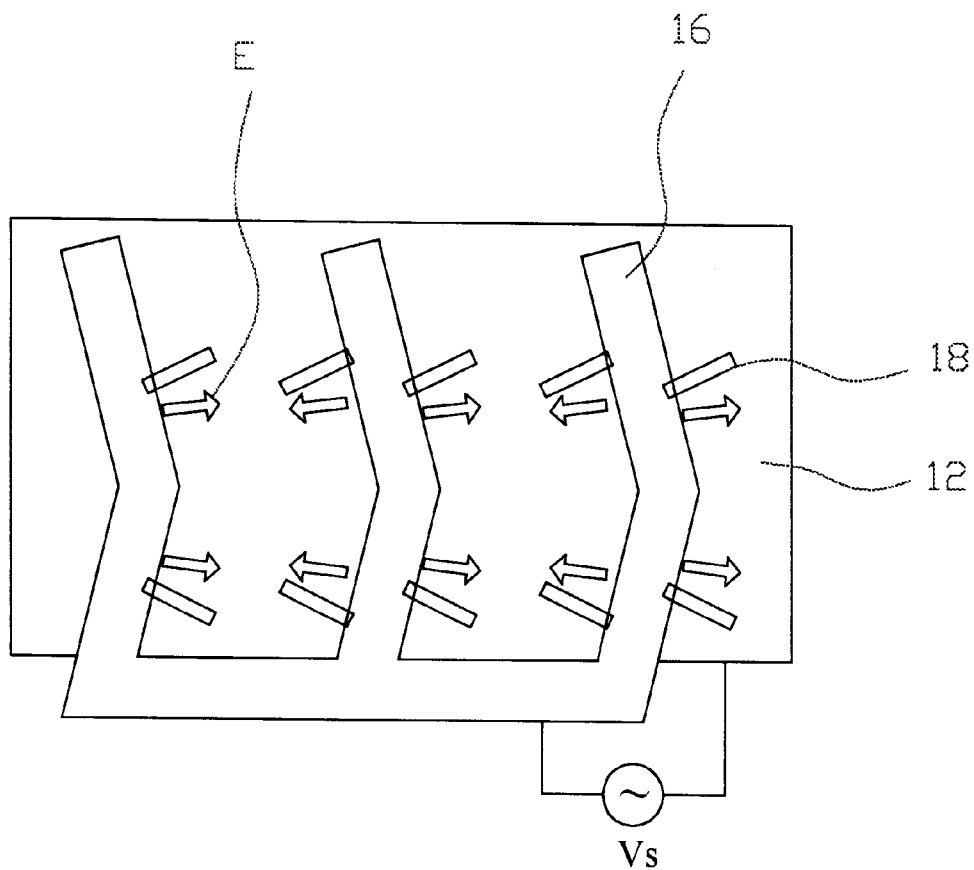
FIG. 15 shows another structure of the reflective or transflective electrode to produce a two-domain fringe field.

Further, the stripes of the common electrode 16 can have various shapes. For example, a bent stripe or two-domain scheme for the common electrode 16 is shown in FIG. 15. When a voltage Vs is applied between the electrodes 12 and 16 in this scheme, an electric field E is produced with a projected direction from a strip to another in the horizontal planes and the LC molecules 18 are twisted by the electric field E. The largest angle the LC molecules 18 are twisted is in the direction normal to the stripes of the common electrode 16.

Figure 16:
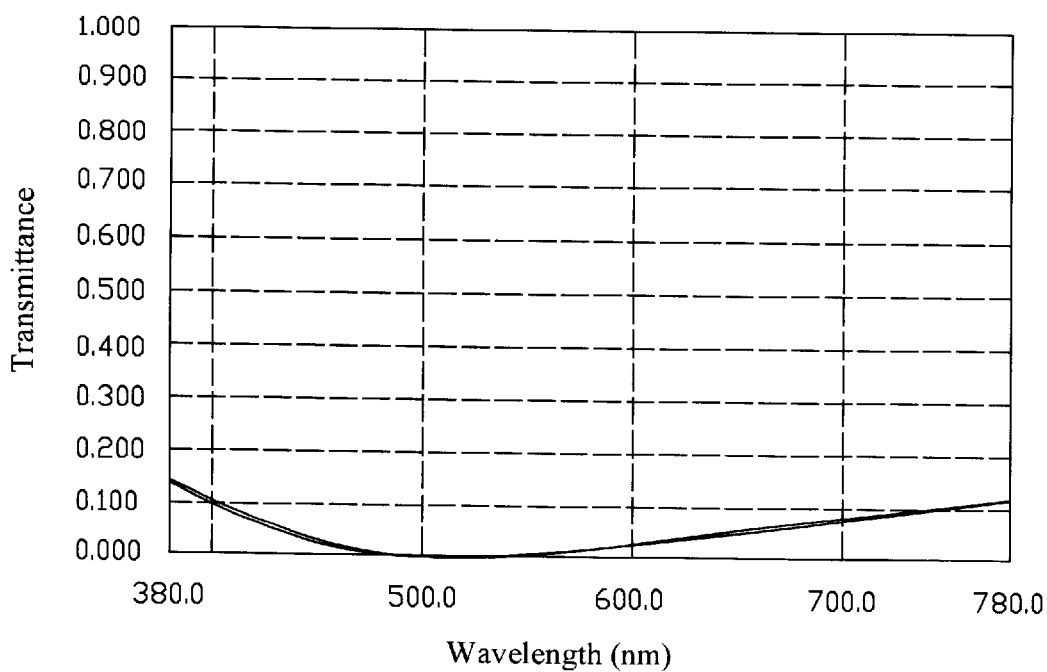
FIG. 16 shows a simulation of transmittance versus wavelength for the dark state of the SFFC reflective LCD shown in FIG. 1.

To obtain a better contrast display, i.e., a better dark state, a conventional reflective TN mode LCD requests at least two compensators of one extended axis in combination with a polarizer. On the other hand, the fringe field in a conventional transmittive LCD twisting the LC molecules thereof in the horizontal plane in combination with a pair of cross-polarizers can obtain a wider viewing angle and improve the contrast ratio (normal black). However, if such a fringe field scheme is applied for a reflective LCD, the dark state and contrast ratio are poor since the effect thereof is equivalent to a parallel polarizer when combined with single polarizer. Contrarily, the scheme according to the present invention introduces a scattering film to improve brightness thereof and thus the signal-to-noise ratio is increased. Further, in combination with the retardation resulted from the LC, only single compensator and single polarizer is enough to obtain an excellent dark state and contrast ratio, and for a linearly polarized incident light becomes circularly or elliptically polarized after it incidents through the pixel LC and then linearly polarized orthogonal to the polarization of the original incident light after it is reflected back the pixel LC. That is, the mechanism for modulation of the light is different from those of conventional reflective LCD's and transmittive LCD's employed with fringe field. In such scheme, the bent electric field E is generated to drive the LC 18 to induce a phase difference such that wide viewing angle and low color dispersion both are available, and the LC retardation thereby combines the scattering film 20 and compensator 24 to improve the contrast ratio. A simulation of transmittance to various wavelengths in the dark state for the embodiment arrangement shown in FIG. 1 is provided with FIG. 16, of which an ultra contrast ratio of 1000:1 is achieved and the wavelength dependence is very low for the light from 380 nm to 780 nm.

Figure 17:
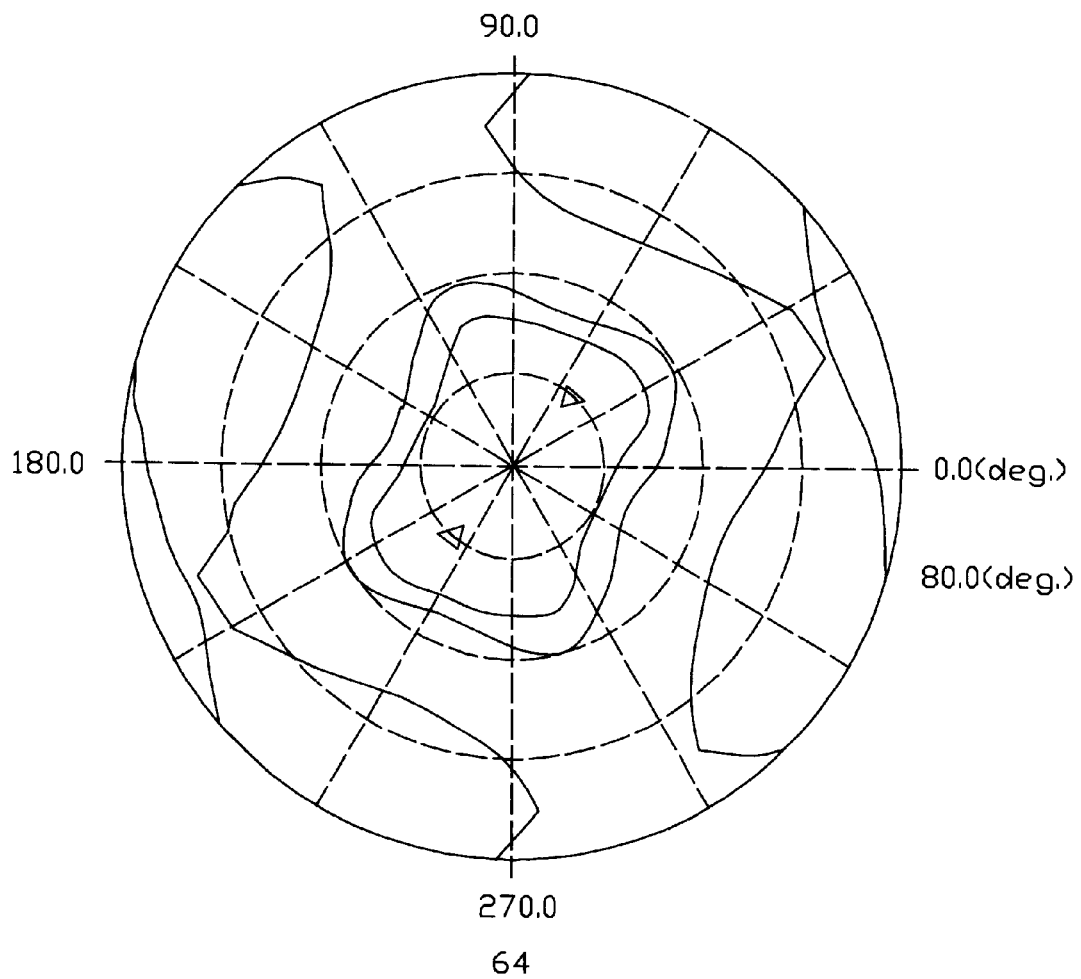
FIG. 17 shows a simulation of iso-contrast contour for the dark state of the SFFC reflective LCD shown in FIG. 1.
Figure 18:
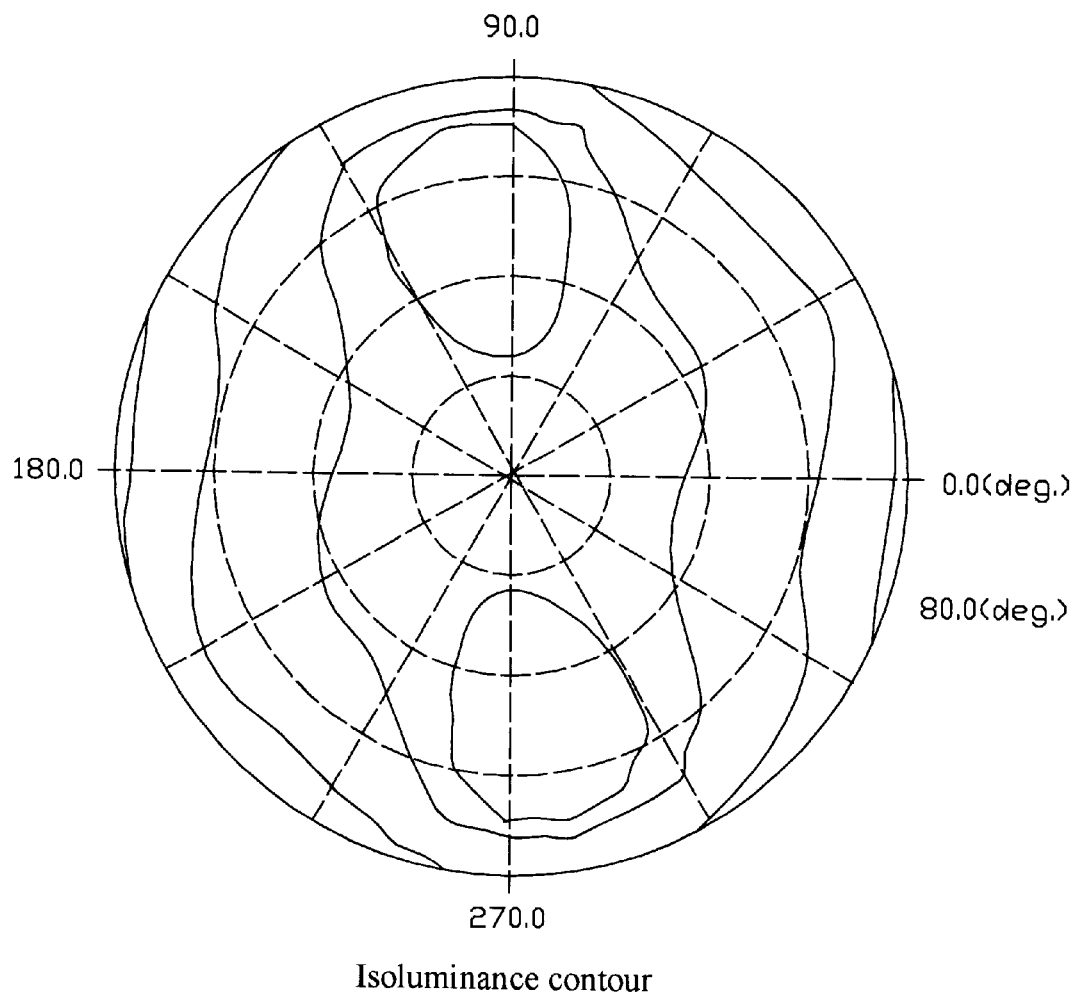
FIG. 18 shows a simulation of iso-luminance contour for the bright state of the SFFC reflective LCD shown in FIG. 1.

Simulations of iso-contrast contour in the dark state and iso-luminance contour in the bright state for the embodiment arrangement shown in FIG. 1 are shown in FIGS. 17 and 18, respectively. Merck MJ981000 LC with $\Delta\epsilon=-4.5$ and $\Delta n=0.0771$ is used for the LC in the simulations, and the cell gap is 3.57 μm.

Figure 19:
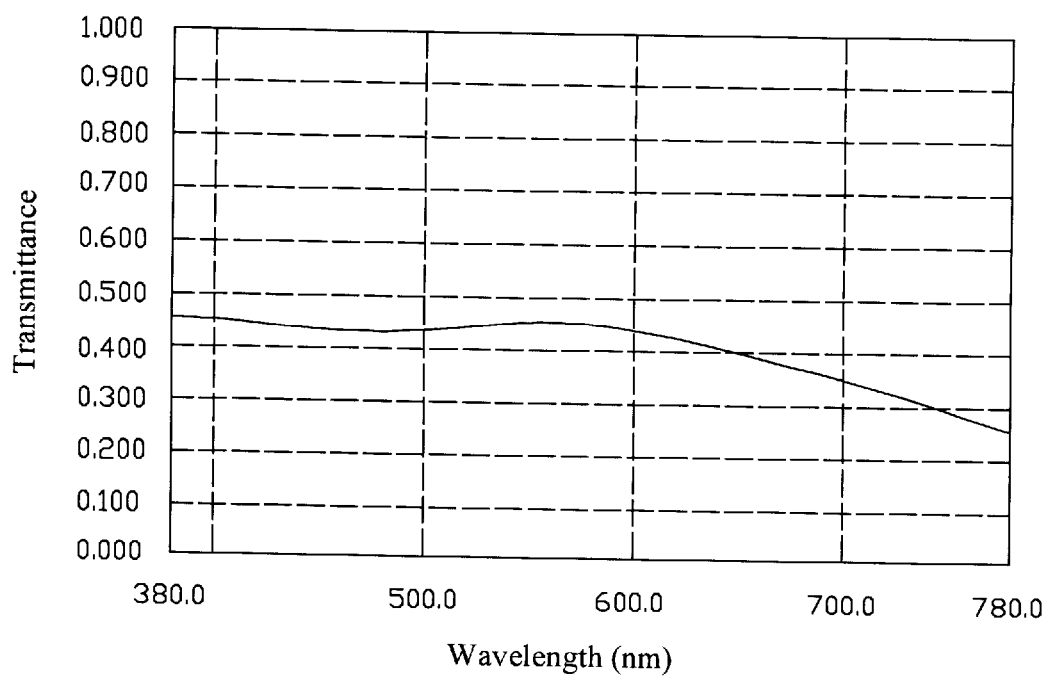
FIG. 19 shows a simulation of transmittance versus wavelength for the bright state to illustrate the color dispersion of the SFFC reflective LCD shown in FIG. 1.
Figure 20:
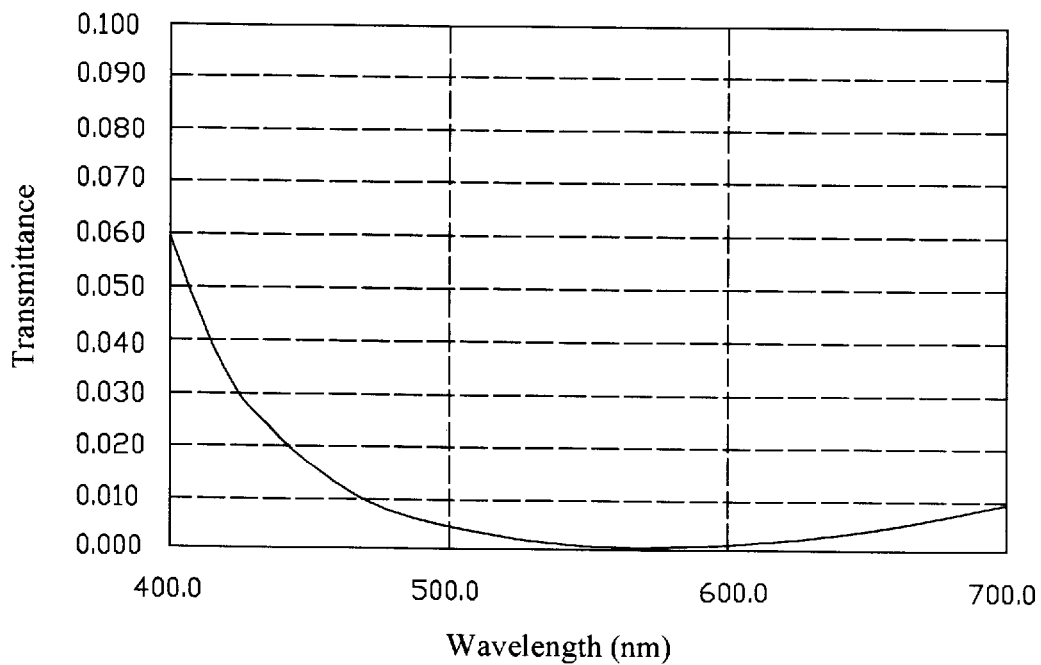
FIG. 20 shows a simulation of transmittance versus wavelength for the dark state to illustrate the color dispersion of the SFFC reflective LCD shown in FIG. 1.

For illustration of the color dispersion, simulations of transmittance to various wavelengths in the bright state and in the dark state are shown in FIGS. 19 and 20. The light leakage is very small and the color dispersion is very low. The contrast ratio in the orthogonal direction exceeds over 1000:1.

Figure 21:
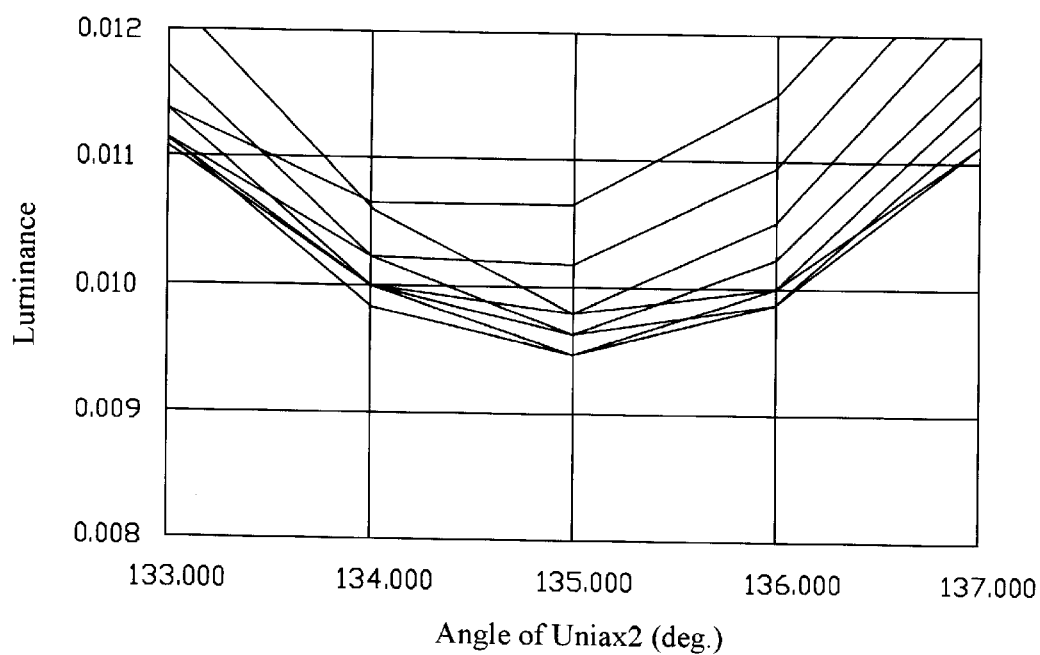
FIG. 21 shows a simulation of the luminance of light leakage at the dark state versus the angle between the LC retardation and the compensator.
Figure 22:
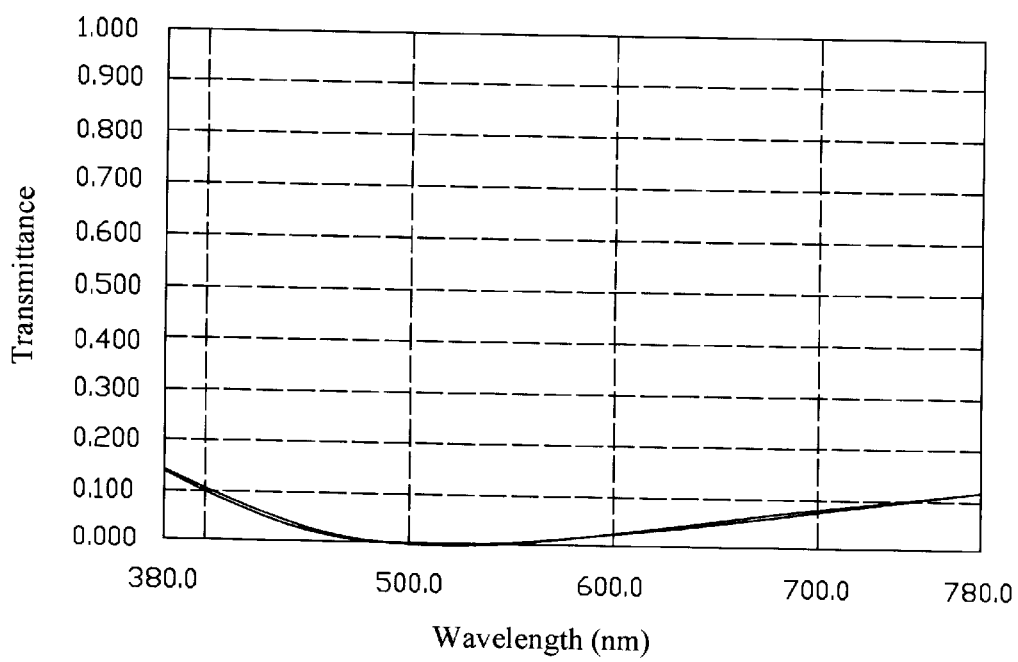
FIG. 22 shows a simulation of transmittance versus wavelength with optimized angle between the LC retardation and the polarizer.

Moreover, the luminance of light leakage at the dark state versus the angle between the LC retardation and the compensator is simulated in FIG. 21, and FIG. 22 is a simulation of transmittance versus wavelength with optimized angle between the LC retardation and the polarizer.

Figure 23:
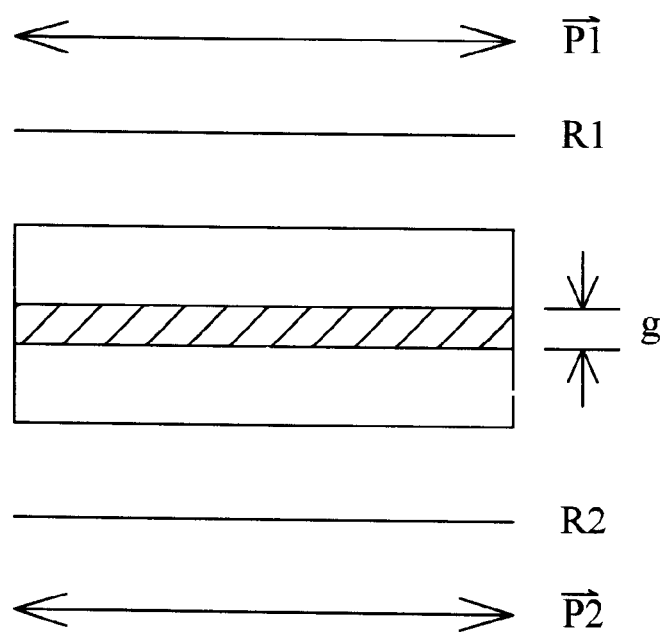
FIG. 23 shows a simplified illustration of the optical arrangement for a transflective LCD from the cross-sectional view.
Figure 24:
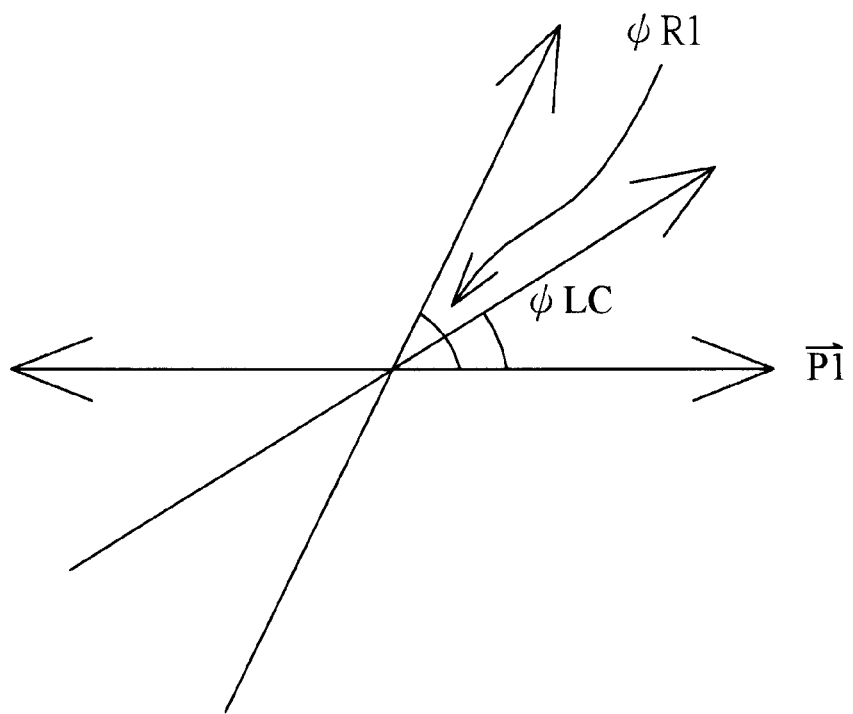
FIG. 24 shows the top view of the arrangement in FIG. 23 for illustration of the direction relationship between the optical elements.

For applications of the present invention, FIG. 23 provides a simplified illustration of the optical arrangement for al transflective LCD from the cross-sectional view, and that for a reflective LCD can be obtained by removing the rear side compensator R2 and polarizer P2. In the scheme, P1 and P2 represent the front and rear polarizer, respectively, and R1 and R2 represent the front and rear compensator, respectively. P1 and P2 are arranged with their polarization direction parallel. The compensator R1 and R2 may be a plate or a series of films. In addition, the negative type of LC layer with a cell gap g and ordinary and extraordinary refractive index $n_o$ and $n_e$ will produce a phase difference by $$\Theta_{LC} = \Delta n \times g,$$

where $\Delta n = n_e - n_o$. The top view of the arrangement in FIG. 23 is shown in FIG. 24 for illustration of the direction relationship between the optical elements. In reference to P1, the transparent axis of the front polarizer, the average pointing direction of the LC molecules has an angle $\phi_{LC}$ from P1, and the extension axis of the front compensator R1 is directed with an angle $\phi_{R1}$. In a case for better display, the condition is $$R1 = (n_x - (n_y + n_z)/2) \times t1,$$

$$|\Theta_{LC} - 2R1| \leq 30 \text{ nm, and}$$

$$85° \leq |\phi_{R1} - \phi_{LC}| \leq 95°,$$

where $n_x$, $n_y$ and $n_z$ are the respective refractive index of the compensator R1 in the three axes, and t1 is the thickness the compensator R1. In another case for better display, the condition is $$|2\Theta_{LC} - R1| \leq 30 \text{ nm},$$

$$40° \leq (\phi_{LC} - 2\phi_{R1}) \leq 50°, \text{ and}$$

$$|\phi_{R1} - 14°| \leq 8°.$$

A preferred condition is provided with $$\phi_{R1} = 125° \text{ to } 145°,$$

$$\phi_{LC} = 35° \text{ to } 55°,$$

R1=120 μm to 160 μm, and

Θ$_{LC}$=R2=250 μm to 300 μm.

where R2 is the retardation by the rear compensator.

From the above, it should be understood that the embodiments described, in regard to the drawings, are merely exemplary and that a person skilled in the art may make variations and modifications to the shown embodiments without departing from the spirit and scope of the present invention. All variations and modifications are intended to be included within the scope of the present invention as defined in the appended claims.

What is claimed is:

1. A scattering fringe field optical-compensated reflective liquid crystal display comprising:
   a TFT plate;
   a color filter plate;
   a liquid crystal layer of a negative dielectric anisotropy sandwiched between said TFT plate and color filter plate, said liquid crystal layer having an ordinary and extraordinary refractive index $n_O$ and $n_e$, a cell gap g and a rubbing direction;
   a reflective electrode structure on said TFT plate for applying a fringe field to said liquid crystal layer, said reflective electrode structure including a common electrode and a pixel electrode with an insulator therebetween, said common electrode consisting of a plurality of strips;
   a scattering film between said liquid crystal layer and color filter plate;
   a compensator on said color filter plate, said compensator having a thickness t, an extension axis and respective refractive index $n_x$, $n_y$ and $n_z$ in three axes; and
   a polarizer with a polarization direction arranged outside said color filter plate, said polarization direction having an angle $\phi_R$ from said extension axis and an angle $\phi_{LC}$ from said rubbing direction;
   wherein $\theta_{LC}=(n_e-n_o)\times g$ and $R=(n_x-(n_y+n_z)/2)\times t$, and said liquid crystal layer, compensator and polarizer are arranged under a condition of $|\theta_{LC}-2R|\leq 30$ nm and $85°\leq|\phi_R-\phi_{LC}|\leq 95°$, or $|2\theta_{LC}-R|\leq 30$ nm, $40°\leq(\phi_{LC}-2\phi_R)\leq 50°$ and $|\phi_R-14°|\leq 8°$.

2. An LCD according to claim 1 wherein said common electrode and pixel electrode are totally reflective.

3. An LCD according to claim 1 wherein said common electrode and pixel electrode are metals.

4. An LCD according to claim 1 wherein said strips each has a width of 1–10 μm.

5. An LCD according to claim 1 wherein said strips are spaced from each other with 1–10 μm.

6. An LCD according to claim 1 wherein said, strips each is bent.

7. A scattering fringe field optical-compensated transflective liquid crystal display comprising:
   a TFT plate;
   a color filter plate;
   a liquid crystal layer of a negative dielectric anisotropy sandwiched between said TFT plate and color filter plate, said liquid crystal layer having an ordinary and extraordinary refractive index $n_o$ and $n_e$, a cell gap g and a rubbing direction;
   a transflective electrode structure on said TFT plate for applying a fringe field to said liquid crystal layer, said transflective electrode structure including a common electrode and a pixel electrode with an insulator therebetween, said common electrode consisting of a plurality of strips;
   a scattering film between said liquid crystal layer and color filter plate;
   a front compensator on said color filter plate, said front compensator having a thickness $t_f$, a first extension axis and respective refractive index $n_{fx}$, $n_{fy}$ and $n_{fz}$ in three axes;
   a rear compensator on said TFT plate, said rear compensator having a thickness $t_r$, a second extension axis and respective refractive index $n_{rx}$, $n_{ry}$ and $n_{rz}$ in three axes; and
   a front polarizer with a first polarization direction arranged outside said color filter plate, said first polarization direction having an angle $\phi_{Rf}$ from said first extension axis and an angle $\phi_{LC}$ from said rubbing direction; and
   a rear polarizer arranged outside said TFT plate, said rear polarizer having a second polarization direction parallel to said first polarization direction;
   wherein $\theta_{LC}=(n_e-n_o)\times g$ and $R_f=(n_{fx}-(n_{fy}+n_{fz})/2)\times t_f$, and said liquid crystal layer, front compensator and front polarizer are arranged under a condition of $|\theta_{LC}-2R_f|\leq 30$ nm and $85°\leq|\phi_{Rf}-\phi_{LC}|\leq 95°$, or $|2\theta_{LC}-R_f|\leq 30$ nm, $40°\leq(\phi_{LC}-2\phi_{Rf})\leq 50°$ and $|\phi_{Rf}-14°|\leq 8°$.

8. An LCD according to claim 7 wherein said common electrode and pixel electrode are partially reflective and partially transparent.

9. An LCD according to claim 7 wherein said common electrode is reflective and said pixel electrode is transparent.

10. An LCD according to claim 7 wherein said common electrode and pixel electrode are metal and ITO respectively.

11. An LCD according to claim 7 wherein said pixel electrode includes a plurality of reflective regions and a plurality of transparent regions and said common electrode is transparent.

12. A pixel according to claim 7 wherein said common electrode and pixel electrode are very thin metals.

13. An LCD according to claim 7 wherein said pixel electrode includes a plurality of reflective regions and a plurality of transparent regions and said common electrode is reflective.

14. An LCD according to claim 7 wherein said strips each has a width of 1–10 μm.

15. An LCD according to claim 7 wherein said strips are spaced from each other with 1–10 μm.

16. An LCD according to claim 7 wherein said strips each is bent.

17. An LCD according to claim 7 wherein $\phi_{rf}$ is in a range of 125° to 145°, $\phi_{LC}$ is in a range of 35° to 55°, tf is in a range of 120 μm to 160 μm, and $\phi_{LC}$ and $R_r$ are equal and in a range of 250 μm to 300 μm with $R_r$ representative of a retardation by said rear compensator.

* * * * *